United States Patent
Ueda et al.

(10) Patent No.: US 8,765,280 B2
(45) Date of Patent: Jul. 1, 2014

(54) BATTERY PACK AND BATTERY-DRIVEN POWER TOOL USING THE SAME

(75) Inventors: Takashi Ueda, Hitachinaka (JP);
Haruhisa Fujisawa, Hitachinaka (JP);
Junichi Toukairin, Hitachinaka (JP);
Hiroyuki Hanawa, Hitachinaka (JP);
Keita Saitou, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 861 days.

(21) Appl. No.: 12/530,955

(22) PCT Filed: Apr. 23, 2008

(86) PCT No.: PCT/JP2008/058295
§ 371 (c)(1),
(2), (4) Date: Sep. 11, 2009

(87) PCT Pub. No.: WO2008/133340
PCT Pub. Date: Nov. 6, 2008

(65) Prior Publication Data
US 2010/0092850 A1    Apr. 15, 2010

(30) Foreign Application Priority Data

Apr. 23, 2007  (JP) ................................ 2007-112666
Oct. 29, 2007  (JP) ................................ 2007-280279

(51) Int. Cl.
| H01M 2/10 | (2006.01) |
| H01M 2/20 | (2006.01) |
| H01M 2/30 | (2006.01) |
| H01M 10/052 | (2010.01) |

(52) U.S. Cl.
CPC ............ *H01M 2/1055* (2013.01); *H01M 2/204* (2013.01); *Y02E 60/12* (2013.01); *H01M 2/30* (2013.01); *H01M 10/052* (2013.01)
USPC .................................. 429/99; 30/500; 429/97

(58) Field of Classification Search
USPC ................................. 429/100, 97, 99; 30/500
See application file for complete search history.

(56) References Cited

U.S. PATENT DOCUMENTS

| 4,399,201 A | 8/1983 | Nagahara | |
| 5,401,591 A * | 3/1995 | Bishay et al. | 429/97 |

(Continued)

FOREIGN PATENT DOCUMENTS

| EP | 2308651 | 4/2011 |
| EP | 2431133 | 3/2012 |

(Continued)

OTHER PUBLICATIONS

Japan Patent Office office action for patent application JP2007-112666 (May 25, 2012).

*Primary Examiner* — Ula C Ruddock
*Assistant Examiner* — Frank Chernow
(74) *Attorney, Agent, or Firm* — Kilpatrick Townsend & Stockton LLP

(57) ABSTRACT

A battery pack for use with a battery-driven power tool includes three battery cells in which two out of three are arranged horizontally in parallel to and in alignment with each other in a lower case and the remaining one battery cell is vertically arranged in an upper case. The upper case of the battery pack is inserted, in use, into a battery pack receiving space formed in the grip portion of a power tool. Therefore, the grip portion can be made thin and usability of the power tool is enhanced.

40 Claims, 12 Drawing Sheets

(56) References Cited

U.S. PATENT DOCUMENTS

| | | |
|---|---|---|
| 5,633,096 A | 5/1997 | Hattori |
| 6,057,608 A | 5/2000 | Bailey et al. |
| 6,566,005 B1 | 5/2003 | Shimma et al. |
| 6,933,689 B2 | 8/2005 | Yamamoto |
| 7,443,137 B2 | 10/2008 | Scott et al. |
| 2003/0201738 A1 | 10/2003 | Yamamoto |
| 2006/0112570 A1 | 6/2006 | Serdynski et al. |
| 2006/0222930 A1 | 10/2006 | Aradachi et al. |
| 2008/0012530 A1 * | 1/2008 | Johnson et al. ............ 320/116 |
| 2009/0011325 A1 | 1/2009 | Agehara et al. |

FOREIGN PATENT DOCUMENTS

| | | |
|---|---|---|
| JP | 2000-061868 A | 2/2000 |
| JP | 2001-135290 A | 5/2001 |
| JP | 2001-143768 A | 5/2001 |
| JP | 2003-317687 A | 11/2003 |
| JP | 2006-294310 A | 10/2006 |
| JP | 2006-302759 A | 11/2006 |
| JP | 2007-015045 A | 1/2007 |
| JP | 2007-188717 A | 7/2007 |
| SU | 1588537 | 8/1990 |
| WO | WO2006/052825 A2 | 5/2006 |

\* cited by examiner

LONGITUDINAL DIRECTION

WIDTHWISE DIRECTION

BATTERY PACK AND BATTERY-DRIVEN POWER TOOL USING THE SAME

TECHNICAL FIELD

The present invention relates to a battery pack and a battery-driven power tool on which the battery pack is detachably mounted.

BACKGROUND ART

Cordless, hand-held, battery-driven power tools use a battery pack as a power source. The battery pack includes a battery case in which a plurality of battery cells is accommodated.

In performing driving operations of the hand-held power tools, a user has to hold the power tool. Hence, it is required that such a power tool be light in weight, compact in size and have an easy-to-grasp grip portion.

FIGS. 1A to 1C show one conventional power tool 101 and a battery pack 105 used therein. FIG. 1A is a side cross-sectional view showing a conventional power tool 101. FIG. 1B is a side cross-sectional view showing a battery pack 105 mounted on the power tool 101 shown in FIG. 1A. FIG. 1C is a cross-sectional view of the battery pack 105 taken along a line IC-IC in FIG. 1B. The power tool 101 has a housing 102. The housing 102 includes a body portion 102A and a grip portion 102B. A motor 103 is housed in the body portion 102A. The motor 103 has a rotational shaft extending horizontally and coupled to an output shaft 104 via a speed reduction mechanism also housed in the body portion 102A. The motor 103 is energized when a switch 106 is turned on.

As shown in FIG. 1C, the battery pack 105 includes a battery case 107 into which three battery cells 108 are accommodated. Each battery cell 108 is of a generally cylindrical shape having a circular cross-section. Two battery cells 108 are disposed in side-by-side on the bottom of the case 107 and the remaining one battery cell 108 is placed above the two battery cells. Stated differently, three battery cells 108 are horizontally arranged and the battery pack 105 is mounted on the grip portion 102 in such a way that the case 107 is protruded from the bottom of the grip portion 102B by a height h'. Accordingly, while the grip portion 102B can be made thin, the vertical size of the power tool 101 is made large.

FIGS. 2A to 2C show another conventional power tool 201 and a battery pack 205 used therein. FIGS. 2A to 2C correspond to FIGS. 1A to 1C, respectively. The same reference numerals used in FIGS. 2A to 2C denote the same components described with reference to FIGS. 1A to 1C.

As shown in FIGS. 2B and 2C, the battery pack 205 includes a battery case 207 into which three battery cells 108 are vertically arranged. The battery pack 205 is inserted into the inner space of the grip portion 102B. As a result, the overall size of the power tool 201 can be made compact. However, the grip portion 102B become thick as three vertically arranged battery cells 108 are accommodated in the grip portion 102B.

Japanese Patent Application Publication No. 2006-302759 discloses a battery pack in which accommodated are two vertically arranged battery cells and two horizontally battery cells. When the battery pack is mounted on the power tool, a part of the battery pack protrudes from the bottom end of the grip portion and the remaining part of the battery pack is inserted into the grip portion. The grip portion is not so thin as the user can easily and firmly grasp the grip portion.

DISCLOSURE OF INVENTION

In view of the foregoing, the present invention has been made to compromise the drawbacks accompanying the conventional battery packs and to provide an improved battery pack that is compact in size and easy to operate.

In order to achieve the above and other objects, a battery pack according to one aspect of the invention is detachably mountable on a power tool containing a battery-driven motor, and includes a case and a plurality of battery cells including at least a first battery cell, a second battery cell, and a third battery cell wherein the case has an inner space where a position is defined by X axis, Y axis and Z axis orthogonal to one another. The plurality of battery cells is disposed in the inner space of the case in such a manner that only the first battery cell is arranged in a direction of Y axis or vertical direction, the second and third battery cells are arranged in parallel to each other in a direction of X axis or horizontal direction. The first, second and third battery cells are arranged to form an L shape on a plane defined by Y axis and Z axis.

The battery pack further includes a circuit board disposed in the inner space of the case above the second and third battery cells.

Each of the plurality of battery cells is substantially cylindrically shaped having a circular cross-section. It is desirable that a sum of diameters of the second and third battery cells be smaller than a diameter of the motor of the power tool.

Each of the plurality of battery cells is elongated and substantially cylindrically shaped having an outer periphery and end faces at two opposite sides. In one aspect of the invention, the end faces at one side of the second and third battery cells are in contact with the outer periphery of the first battery cell.

It is desirable that the first battery cell is positioned below a gravity point of the motor when the battery back is mounted on the power tool.

The battery pack of the invention is particularly usable if lithium-ion battery cells are used.

A plurality of electrode terminals is connected to the plurality of battery cells, and a circuit board is provided for mounting the plurality of electrode terminals thereon. In one aspect of the invention, the case includes a first case and a second case, the second case being separable from the first case and insertable into the power tool. It is desirable that the circuit board be interposed between the first and second cases when the first and second case portions are combined.

As an example, the first case may be a boat-like shape having a flat bottom and an upper opening. The second and third battery cells are accommodated in the first case. The second case has a cover portion for covering the upper opening of the first case. A battery cell receiving portion protrudes upward from the first longitudinal end of the cover portion and receives the first battery cell therein. It is desirable that the plurality of electrode terminals be disposed in positions closer to the battery cell receiving portion than the second longitudinal end of the cover portion.

The plurality of electrode terminals may be divided into a first set of electrode terminals aligned in a direction orthogonal to a longitudinal direction of the cover portion, and a second set of electrode terminals oriented in a direction orthogonal to a direction in which the first set of electrode terminals is oriented. The circuit board is placed in a direction orthogonal to a direction in which the plurality of electrode terminals is connected to corresponding electrode terminals at a side of the power tool.

A partition may be provided for each of the plurality of electrode terminals. A seal member may also be provided between the partition and the circuit board for sealing a space between the partitions.

It is desirable that the circuit board be positioned so as to be supported by the second and third battery cells.

A damper may be interposed between each of the first, second and third battery cells and the case.

The second case may be formed with a locking pawl engaged with a pawl engagement portion provided in the power tool when the second case is fully inserted into the power tool. The second case may further be formed with a deformation regulating member for regulating a deformed amount of the locking pawl.

According to another aspect of the invention, there is provided a power tool including a motor, a body portion accommodating the motor therein, a grip portion extending from the body portion and formed with a battery pack receiving space, and a battery pack detachably mounted on the grip portion. The battery pack mounted thereon has one or more features mentioned above.

According to yet another aspect of the invention, there is provided a battery pack including a case, a plurality of battery cells accommodated in the case, a plurality of electrode terminals connected to the plurality of battery cells and accommodated in the case, and a circuit board accommodated in the case and mounting the plurality of electrode terminals thereon, wherein the case includes a first case and a second case, the second case being separable from the first case and insertable into the power tool, and wherein the circuit board is interposed between the first and second cases when the first and second case portions are combined.

BRIEF DESCRIPTION OF DRAWINGS

The particular features and advantages of the invention as well as other objects will become apparent from the following description taken in connection with the accompanying drawings, in which.

Figure 1A:
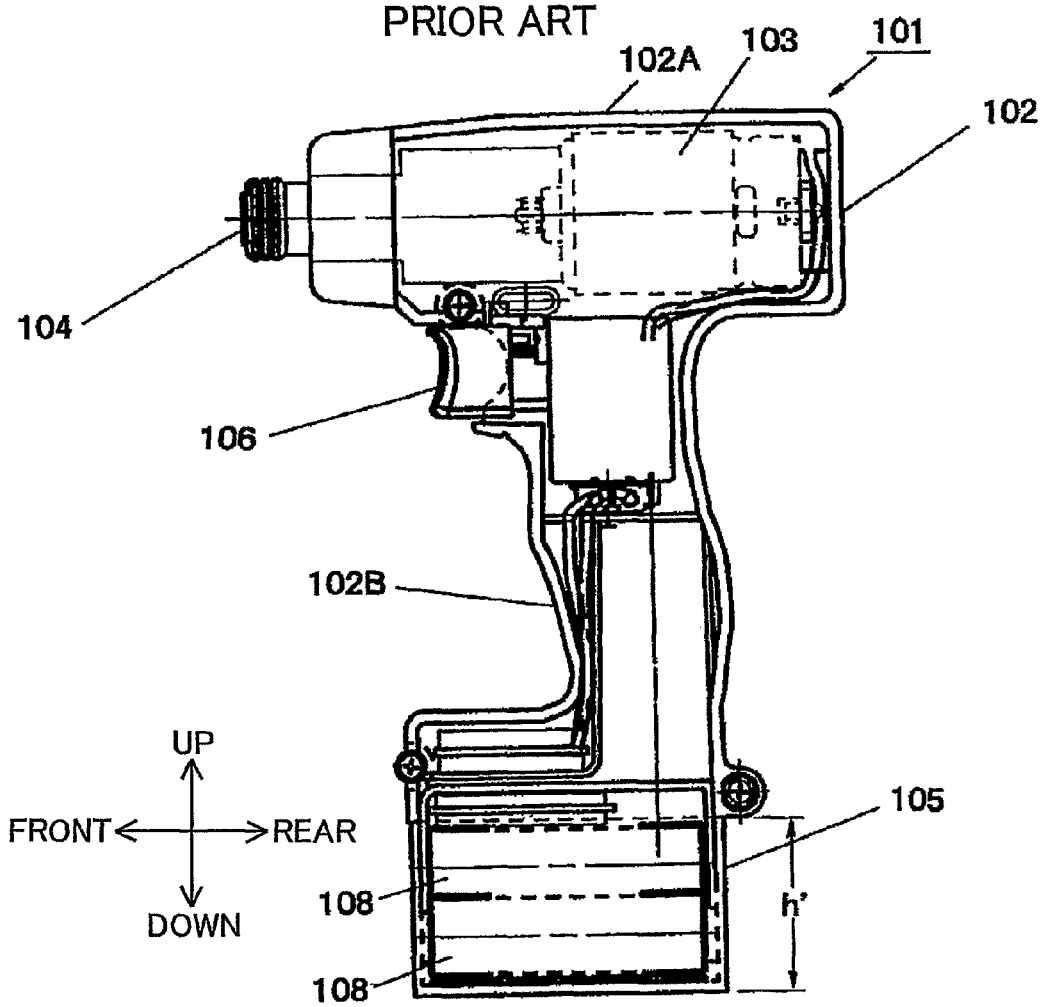
FIG. 1A is a side cross-sectional, schematic view showing a conventional battery-driven power tool on which a battery pack is mounted.
Figure 1B:
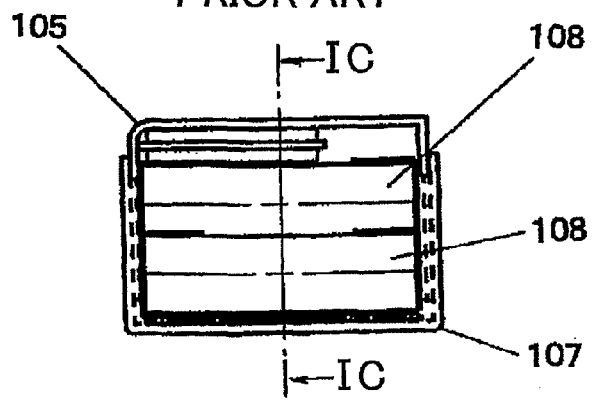
FIG. 1B is a side cross-sectional, schematic view showing the battery pack mounted on the power tool shown in FIG. 1A.
Figure 1C:
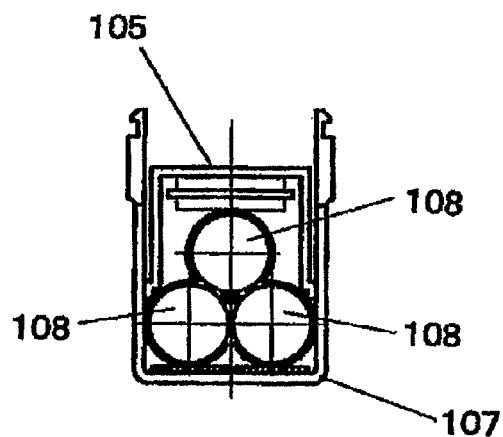
FIG. 1C a cross-sectional view of the battery pack shown in FIG. 1B taken along a line IC-IC.
Figure 2A:
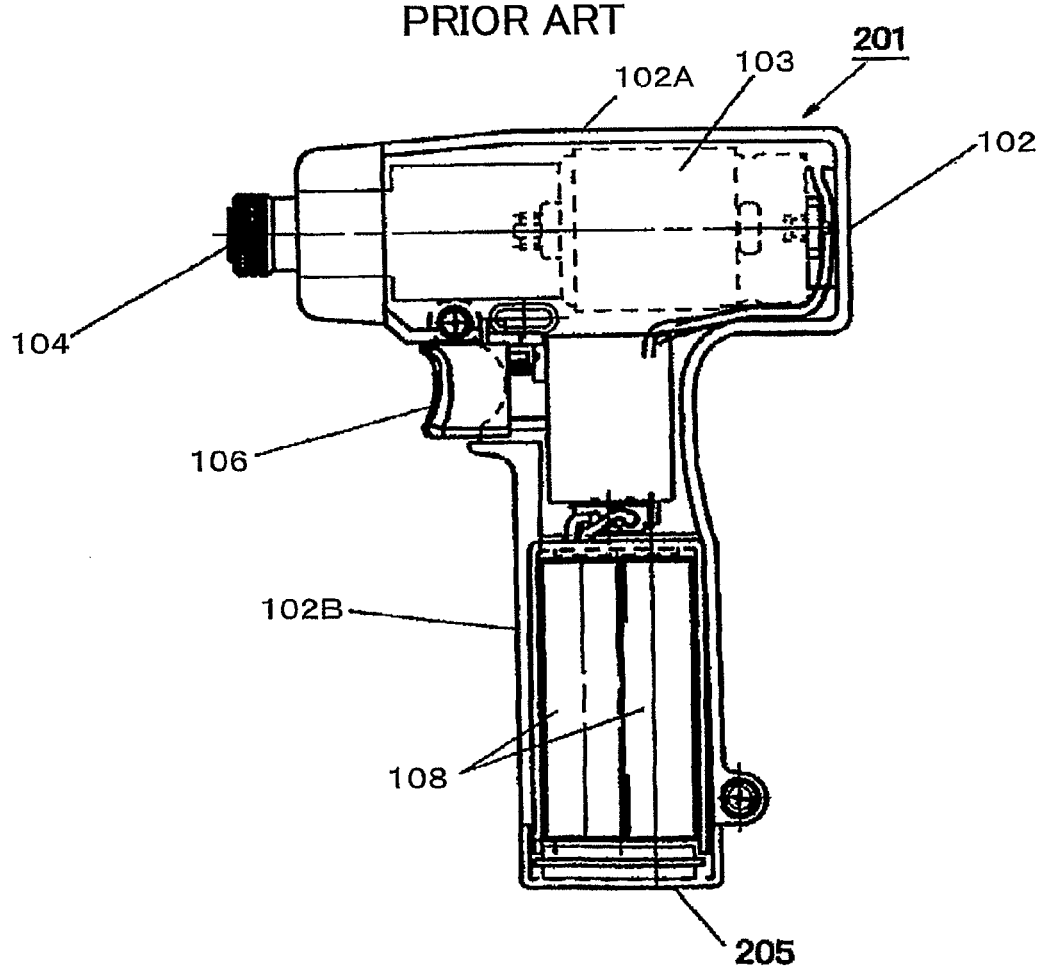
FIG. 2A is a side cross-sectional, schematic view showing another conventional battery-driven power tool on which a battery pack is mounted.
Figure 2B:
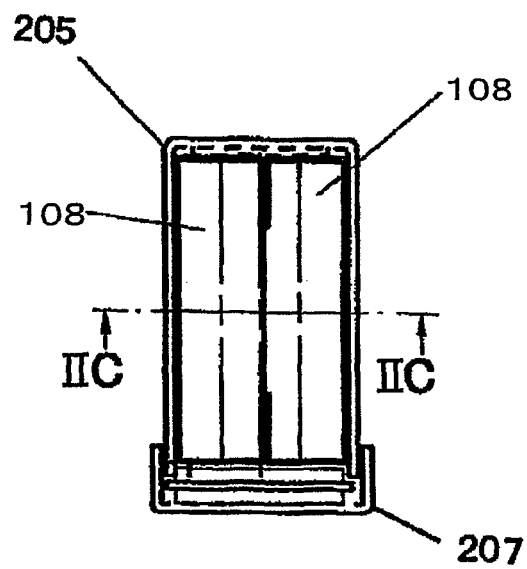
FIG. 2B is a side cross-sectional, schematic view showing the battery pack mounted on the power tool shown in FIG. 2A.
Figure 2C:
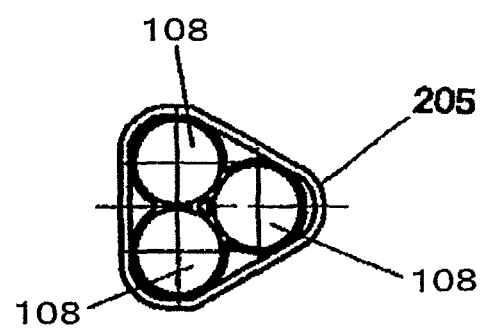
FIG. 2C a cross-sectional view of the battery pack shown in FIG. 2B taken along a line IIC-IIC.

EXPLANATION OF REFERENCE 1, 11, 101, 201 Battery-powered power tool (driver drill)
2, 12 102, 202 Housing
   2A, 12A 102A Body portion
   2B, 12B, 102B Grip portion
   12C Battery pack receiving space
3, 13, 103 Motor
4, 14, 104 Output shaft
5, 15, 105, 205 Battery pack
6, 16, 106 Switch
7, 17, 107, 207 Battery case
   7A, 17A Upper case
   7B, 17B Lower case
8A, 8B, 18A, 18B, 108 Battery cell
9, 19 Circuit board
20 Pedestal
21 Electric wires
22 Wire channel
23 Partition
24 Driver-side electrode terminals
25A, 25B Battery pack-side electrode terminals
26 Battery assembly
27 Battery holding member
28 Battery cell receiving portion
29 Cover portion
30 Stepped-up portion
   30A, 30B Slits
31 Deformation regulating member
32 Locking pawl
33, 34 Damper
35 Partition

BEST MODE FOR CARRYING OUT THE INVENTION

Figure 3A:
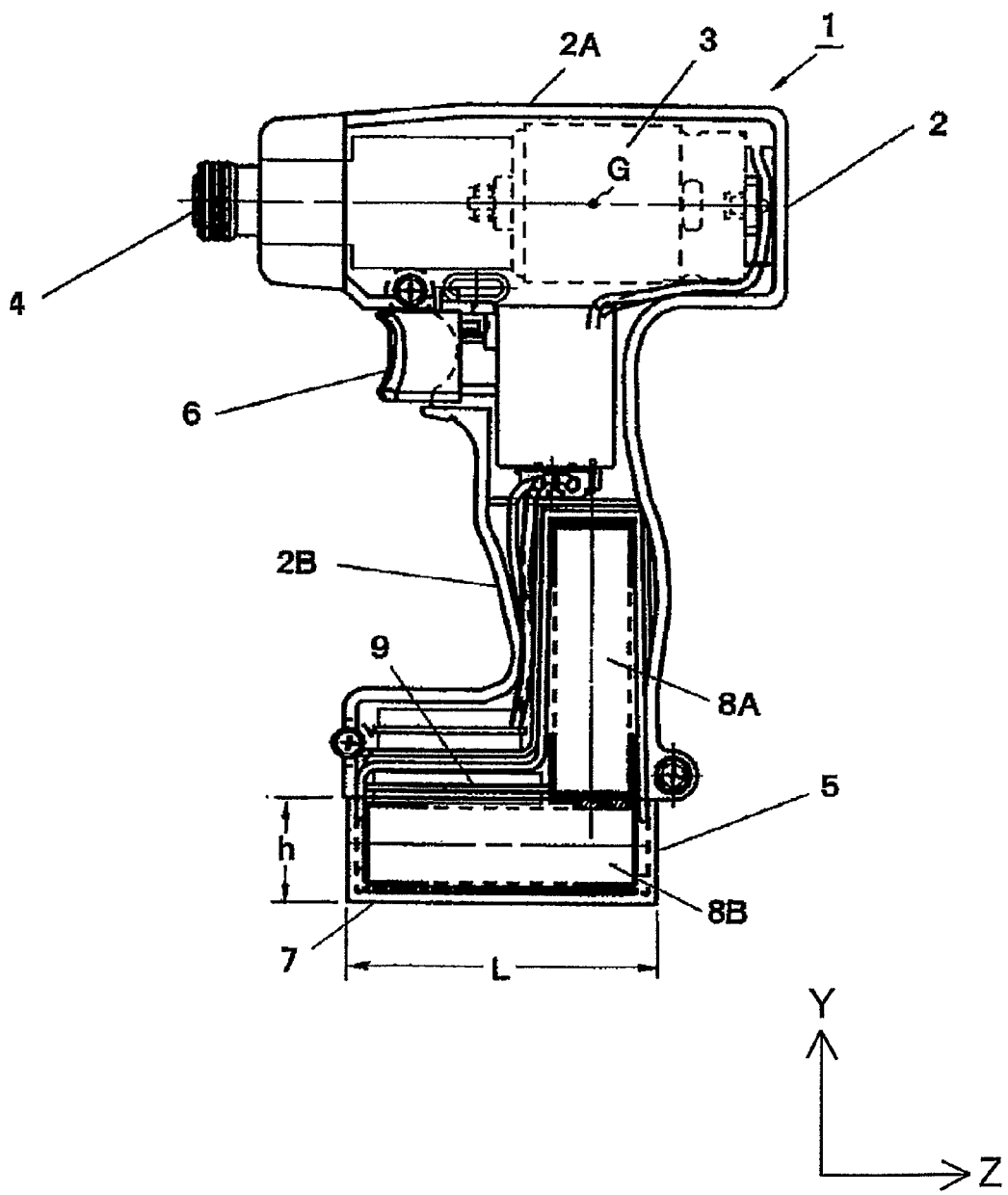
FIG. 3A is a side cross-sectional, schematic view showing a driver drill in accordance with an embodiment of the invention.
Figure 6:
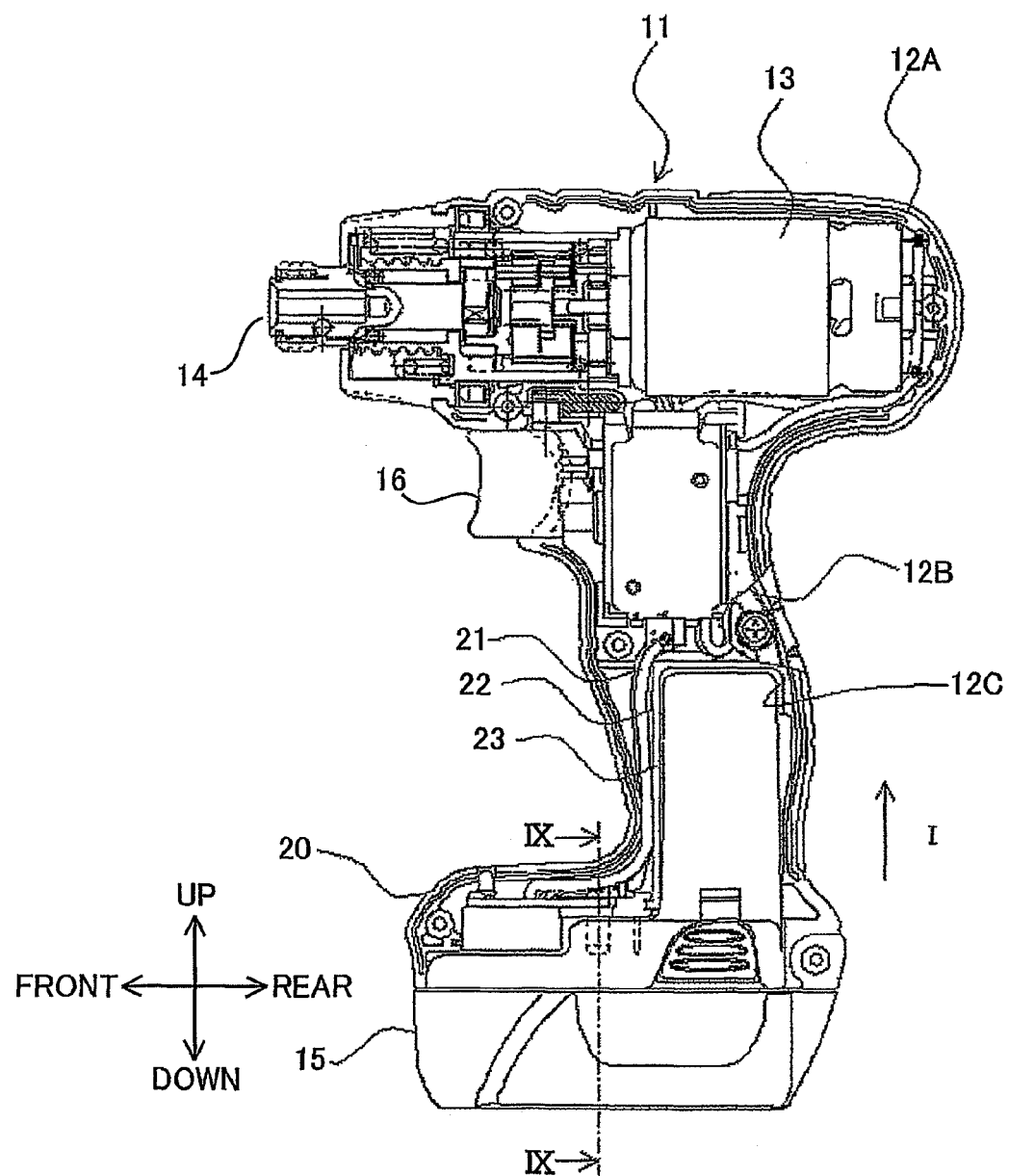
FIG. 6 is a side cross-sectional view showing a detailed structure of the driver drill in accordance with the embodiment of the invention.

The terms "above", "below", "up", "down", "front", "rear" and the like will be used throughout the description to describe positions and/or directions in relation to a battery-driven driver drill disposed in an orientation as shown in FIGS. 3A and 6. It is to be noted that a battery pack is assumed to be placed on a flat table (not shown) extending in a horizontal direction.

Figure 3B:
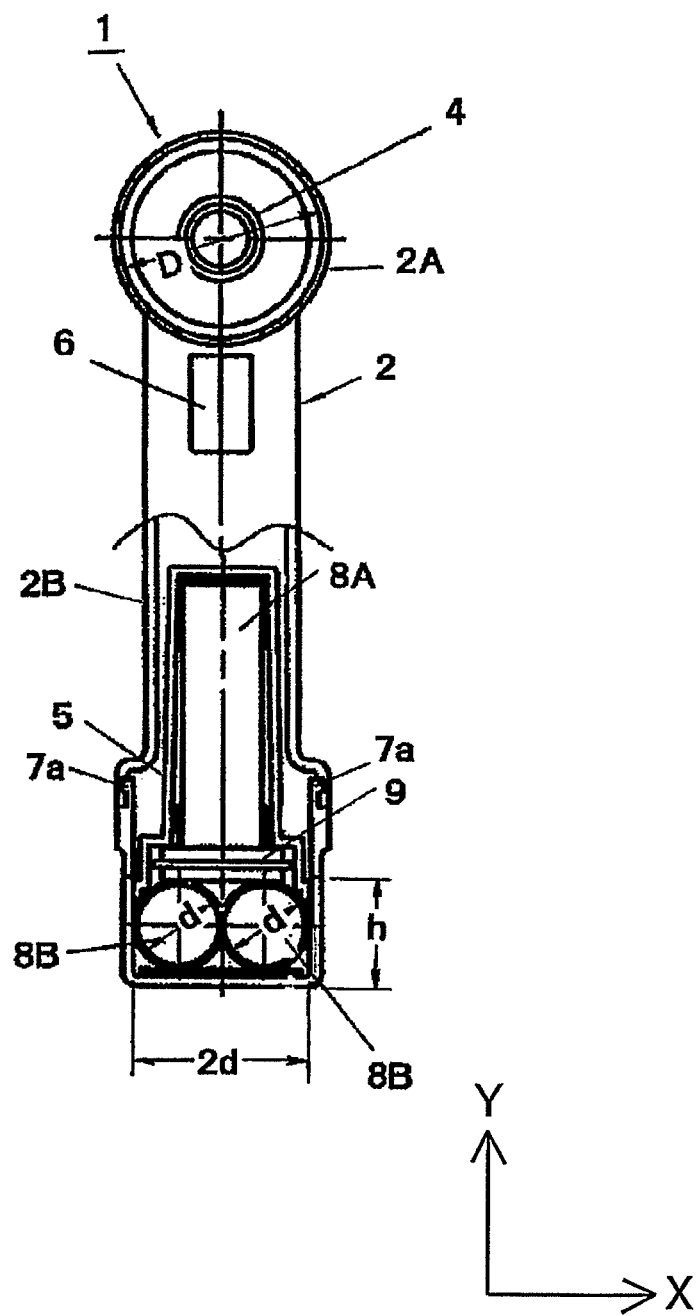
FIG. 3B is a front cross-sectional, schematic view showing the driver drill shown in FIG. 3B.
Figure 4A:
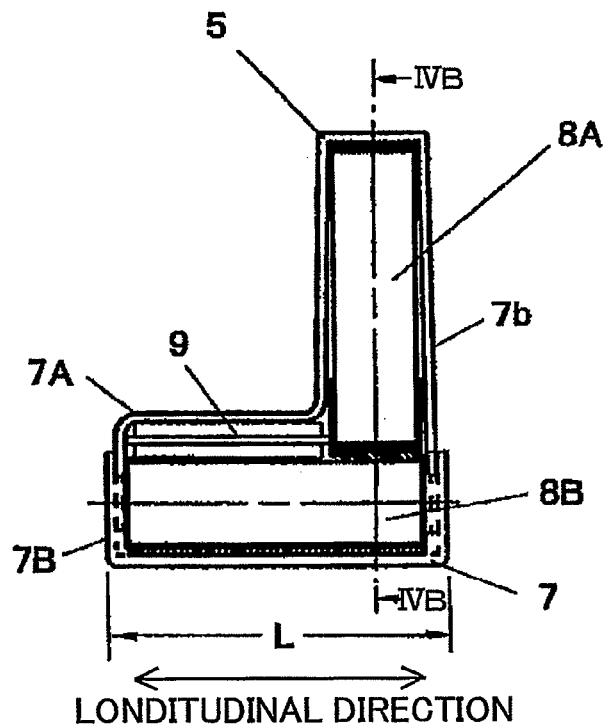
FIG. 4A is a side cross-sectional, schematic view showing a battery pack used in the driver drill shown in FIGS. 3A and 3B.
Figure 4B:
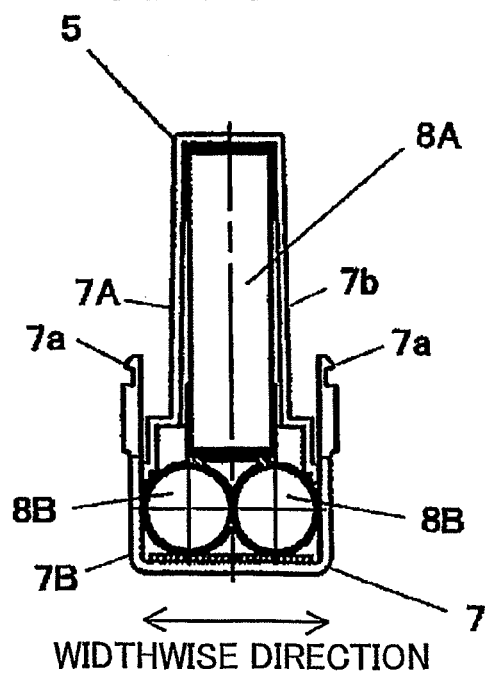
FIG. 4B is a cross-sectional view taken along a line IVB-IVB indicated in FIG. 4A.
Figure 5A:
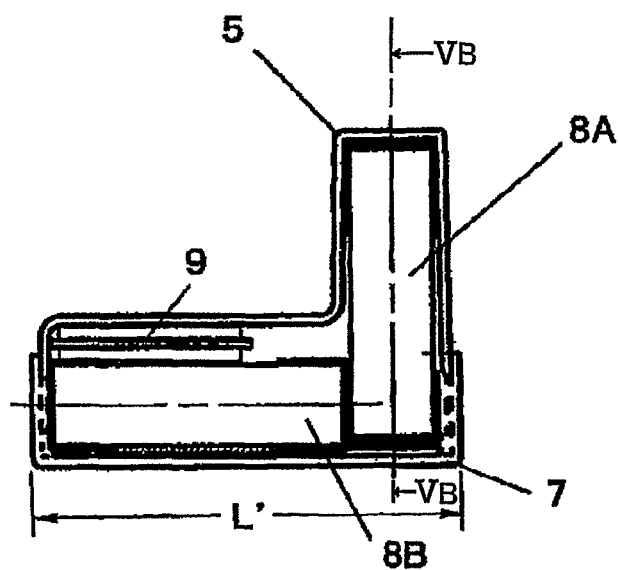
FIG. 5A is a side cross-sectional, schematic view showing a modification of the battery pack shown in FIGS. 4A and 4B.
Figure 5B:
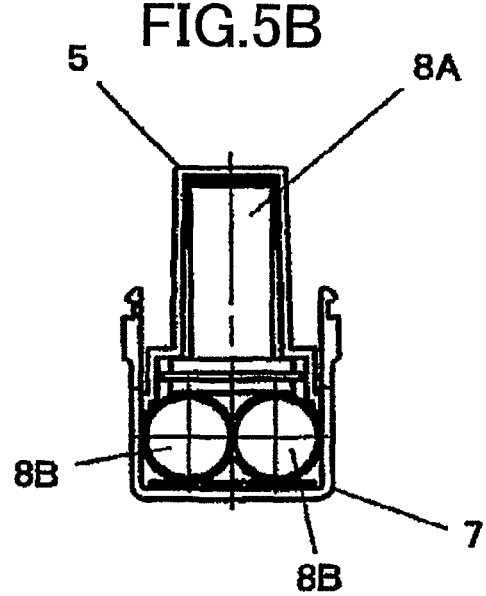
FIG. 5B is a cross-sectional view taken along a line VB-VB indicated in FIG. 5B.

FIG. 3A is a side cross-sectional, schematic view showing a driver drill 1 in accordance with an embodiment of the invention, and FIG. 3B is a front cross-sectional, schematic view showing the driver drill 1 shown in FIG. 3B. FIG. 4A is a side cross-sectional, schematic view showing a battery pack used in the driver drill shown in FIGS. 3A and 3B. FIG. 4B is a cross-sectional view taken along a line IVB-IVB indicated in FIG. 4A. FIGS. 5A and 5B show a modification of the battery pack shown in FIGS. 4A and 4B.

The driver drill 1 has a housing 2 configured from a body portion 2A accommodating a motor 3 therein and a grip portion 2B extending from the horizontal center of the body portion 2A. The grip portion 2B is formed with a battery pack receiving space into which an upper part of a battery pack 5 is inserted. The motor 3 is disposed within the body portion 2A so that its rotational shaft extends horizontally or front-to-rear direction. The rotational shaft is coupled to an output shaft 4 via a speed reduction mechanism configured from, for example, a planetary gear. A drill bit (not shown) attached to the tip end of the output shaft 4 is driven to perform a screw tightening operation or the like. The motor 3 is energized when a switch 6 is turned on and is deenergized when the switch 7 is turned off.

For the brevity of explanation, a position in the battery pack receiving space formed in the grip portion 2B is defined by X axis, Y axis and Z axis orthogonal to one another. As best shown in FIGS. 4A and 4B, three battery cells 8A and 8B are accommodated in a battery case 7 in such a manner that only one battery cell 8A is arranged in a direction of Y axis or vertical direction, and two battery cells 8B are arranged in parallel to and alignment with each other in a direction of X axis or horizontal direction. As shown in FIG. 4A, the three battery cells 8A and 8B are arranged to form an L shape on a plane defined by Y axis and Z axis. In the illustrated example, each battery cell is a lithium-ion battery. A rated voltage of the lithium-ion battery is about three times as large as the rated voltage of a nickel metal hydride battery or nickel-cadmium battery. Hence, a driving voltage required for driving the drill driver 1 can be obtained with a smaller number of lithium-ion battery cells than the nickel metal hydride or nickel-cadmium battery cells. The use of smaller number of battery cells can make the overall size of the driver drill 1 compact.

The battery cell is elongated and substantially cylindrically shaped having an outer periphery and end faces at two opposite sides. The battery cells 8A and 8B are arranged as shown in FIGS. 3A-3B and 4A-4B, in which the lower end face of the vertically arranged battery cell 8A is in contact with the rear-side outer peripheries of the two horizontally arranged battery cells 8B. The three battery cells 8A and 8B are arranged so that the vertical center of the battery cell 8A intersects an outer periphery contact line of the battery cells 8B.

Alternatively, the three battery cells 8A and 8B may be arranged so that the end faces at one side of the two horizontally arranged battery cells 8B are in contact with the outer periphery of the vertically arranged battery cell 8A as shown in FIGS. 5A and 5B. In this case, the lower part of the battery pack 5 protruding from the grip portion 2B has a longitudinal size L' longer than L in the case of example shown in FIGS. 4A and 4B.

The battery case 7 is made up of an upper case 7A and a lower case 7B both made from a resin. The upper case 7A and the lower case 7B when combined form a sealed vessel. The lower case 7B is of a box-shape having a flat bottom and an upper opening. The battery cells 8B are accommodated in the lower case 7B in a manner described above, and a single battery cell 8S is accommodated in the upper case 7A. The upper case 7A is inserted into the battery pack receiving space formed in the grip portion 2B and the lower case 7B protrudes outward from the grip portion 2B. The driver drill 1 adapted for using the battery pack 1 described above can have a thin grip portion 2B, enabling the user to easily and firmly grasp the grip portion 2B. Hence, the usability or operability of the driver drill can be enhanced.

A locking pawl 7a is provided in each sidewall of the lower case 7B. When the battery pack 5 is fully inserted into the battery pack receiving space formed in the grip portion 2B, the locking pawls 7a are brought into engagement with pawl receiving portions formed in the inner wall of the grip portion 2B, thereby fixing the battery pack 5 to the driver drill 1 and preventing the battery pack 5 from detaching from the driver drill 1. The upper case 7A serves as a cover for covering the upper opening of the lower case 7B.

As shown in FIGS. 3A and 3B, a circuit board 9 is disposed in the battery case 7 above the horizontally arranged battery cells 8B to effectively utilize the inner space of the battery case 7. In this position, the circuit board 9 is prevented from being damaged by an impact or external force which may accidentally be imparted upon the battery case 7. Each battery cell is substantially cylindrically shaped having a circular cross-section, and a sum of diameters of the horizontally arranged battery cells 8B is smaller than a diameter of the motor 3, i.e., $2d<D$. This can reduce the widthwise dimension of the driver drill 1 and the overall size of the driver drill 1 can further be reduced. In addition, packing the driver drill 1 can easily be performed.

Further, in the examples shown in FIGS. 3A-3B and 4A-4B, the vertically arranged battery cell 8A is positioned below a gravity point G of the motor 3 when the battery pack 5 is mounted on the power tool 1. By arranging the battery cell 8A in a position below the gravity point G of the motor 3, the weight of the driver drill 1 can be well balanced, thereby enabling the user to easily operate the driver drill 1.

Referring next to FIGS. 6 to 10, description will be made with respect to a detailed structure of the battery pack 15 and the inner space of the grip portion 12B into which the battery pack 15 is inserted.

Figure 7:
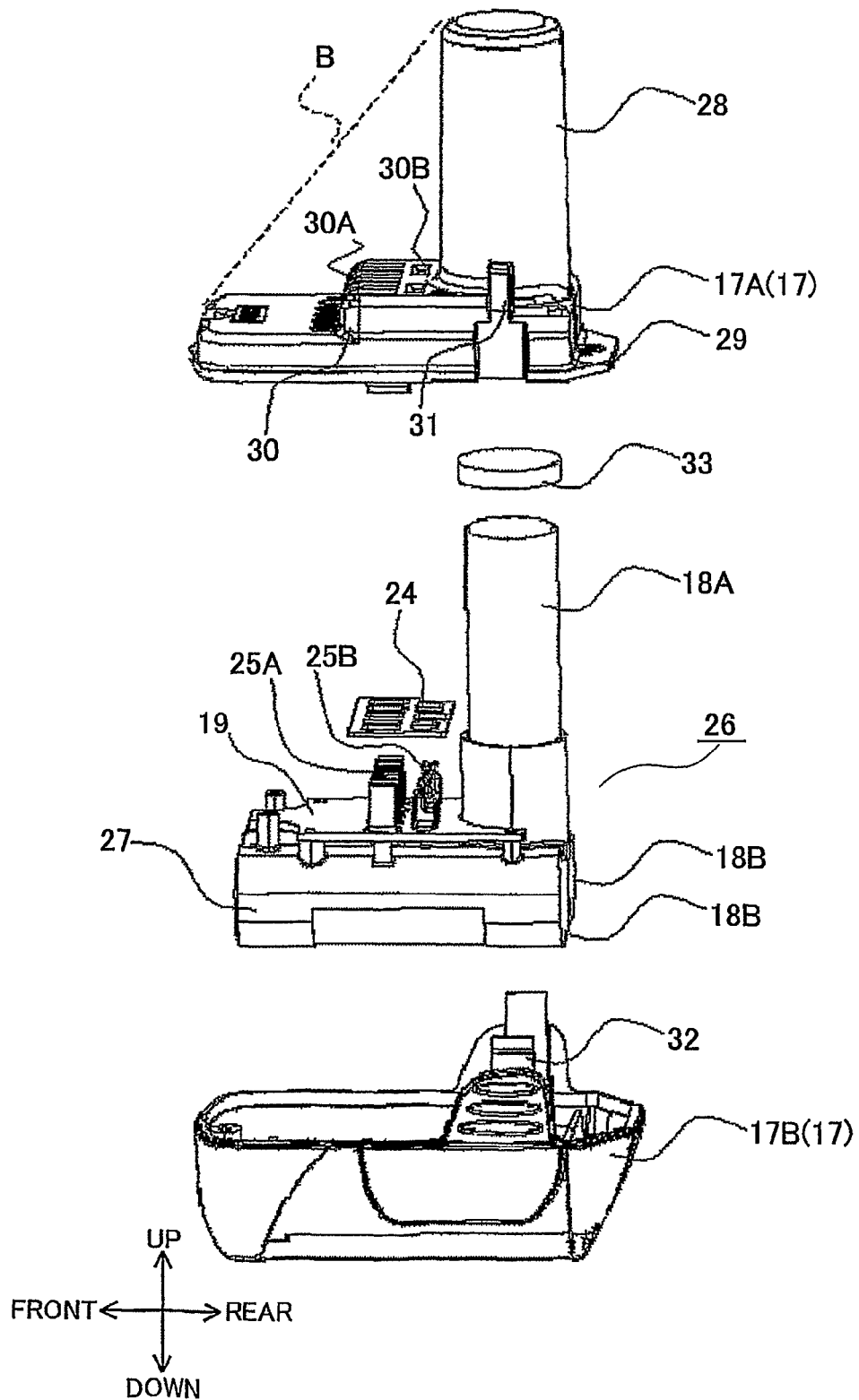
FIG. 7 is an exploded perspective view showing a battery pack to be mounted on the driver drill shown in FIG. 6.
Figure 8:
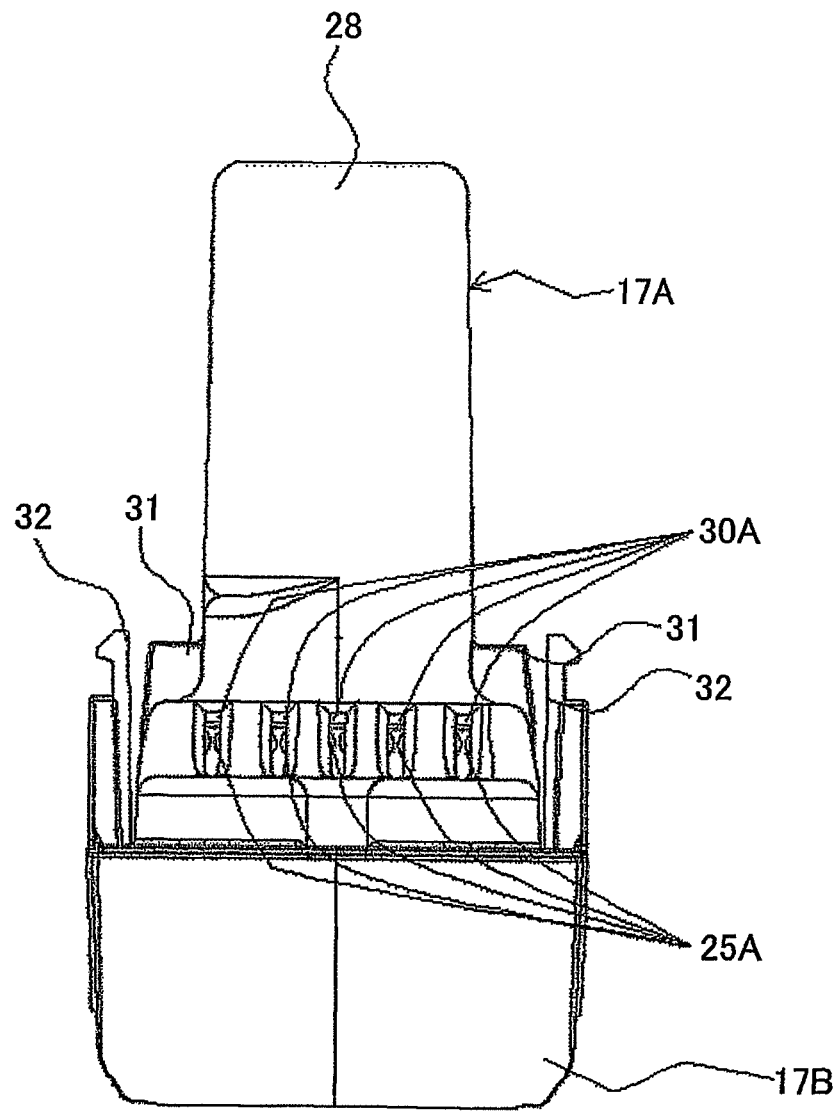
FIG. 8 is a front view showing the battery pack shown in FIG. 7.
Figure 9:
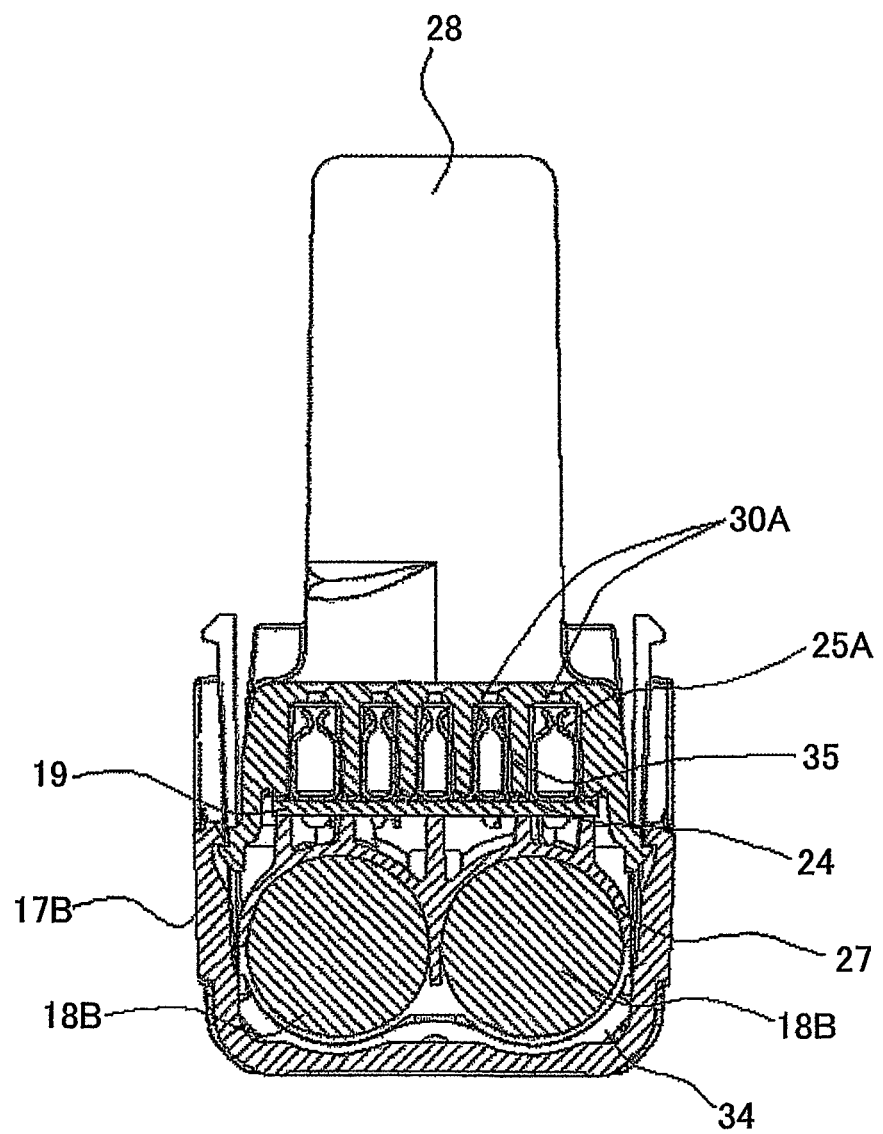
FIG. 9 is a cross-sectional view taken along a line IX-IX indicated in FIG. 6.
Figure 10:
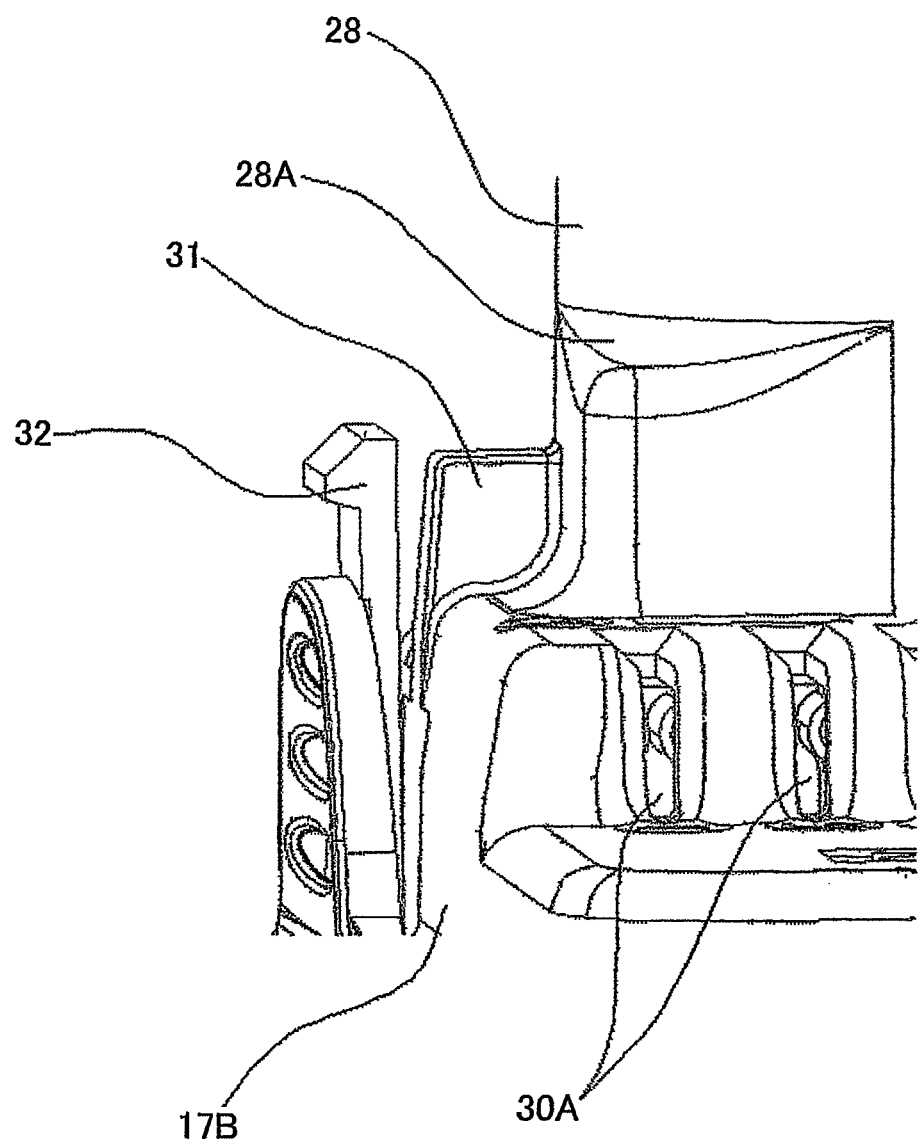
FIG. 10 is a perspective view partially showing a structure around a lock pawl of the battery pack shown in FIG. 7.

FIG. 6 is a side cross-sectional view showing a detailed structure of the driver drill 11 in accordance with the embodiment of the invention. FIG. 7 is an exploded perspective view showing an upper case 17A, a battery assembly 26, and a lower case 17B. FIG. 8 is a front view showing the battery pack shown in FIG. 7. FIG. 9 is a cross-sectional view taken along a line IX-IX indicated in FIG. 6. FIG. 10 is a perspective view partially showing a structure around a locking pawl of the battery pack shown in FIG. 7.

In the driver drill 11 depicted in FIG. 6, the battery pack 15 has been inserted into the inner space of the grip portion 12B. The battery pack 15 is inserted in a direction indicated by an arrow with character "I".

The driver drill 11 is generally T shaped when viewed from its side and is made up of a body portion 12A and the grip portion 12B. The body portion 12A is vertically elongated and has an inner space in which a motor 13 is disposed. The motor 13 is horizontally disposed with its rotational shaft extending horizontally or front-to-rear direction. The rotational shaft of the motor 13 is coupled via a speed reduction mechanism to an output shaft 14 to which a drill bit (not shown) is attached. The driver drill 11 is driven when a switch 16 is turned on. The grip portion 12B extends downward from the horizontal center of the body portion 12A and has a battery pack receiving space 12C. At the lower end of the grip portion 12B is formed a pedestal 20 having a generally rectangular opening at its bottom. To mount the battery pack 15 on the driver drill 11, an upper part of the battery pack 15 or an upper case 17A (see FIG. 7) is inserted into the battery pack receiving space 12C of the grip portion 12B from the lower opening of the pedestal 20. A wire channel 22 is formed vertically along the battery pack receiving space 12 for allowing electric wires 21 from the motor 13 to pass therethrough. A vertical partition 23 is interposed between the wire channel 21 and the battery pack receiving space 12 for regulating or restricting the insertion of the battery pack 15 into the battery pack receiving space 12C. The electric wires 21 are extended near to the bottom of the grip portion 12B for connection to driver-side electrode terminals (not shown).

The driver-side electrode terminals are of a male configuration and project downward from the lower part of the pedestal 20. Battery-pack-side electrode terminals 25A and 25B (see FIG. 7) are of a female configuration adapted to receive the driver-side electrode terminals. When the upper part of the battery pack 15 is fully inserted into the battery pack receiving space 12C of the grip portion 12B, the battery-pack-side electrode terminals 25A and 25B are electrically connected in one-to-one correspondence to the driver-side electrode terminals.

Referring to FIG. 7, the upper and lower cases 17A and 17B form a battery case 17 when combined. The battery assembly 26 is held in the battery case 17. The lower case 17B is a boat-like structure having an upper opening and a flat bottom and accommodates two horizontally arranged battery cells 18B. The battery cells 18B are seated on a sheet-like damper 34 placed on the bottom of the lower case 17B. By virtue of the flat bottom of the lower case 17B, the driver drill 11 with the battery pack 15 mounted thereon can be held in upstanding posture as shown in FIG. 6. The upper case 17A has a battery cell receiving portion 28 protruding upward from a cover portion 29. The battery cell receiving portion 28 is configured to receive the vertically arranged battery cell 18A. A coin-shaped damper member 33 is inserted between the top of the battery cell 18A and the inner top surface of the battery cell receiving portion 28.

The cover portion 29 generally extends horizontally and fitted to the upper opening of the lower case 17B. The upper case 17A and the lower case 17B when combined form an L shape. The upper case 17A has a stepped-up portion 30 at the rear side on the cover portion 29. The stepped-up portion 30 has an upper wall and a front-side vertical wall. Five slits 30A are formed in parallel in the upper and front-side vertical wall of the stepped-up portion 30 to extend in the longitudinal direction of the horizontally arranged battery cell 18B. Two further slits 30B are formed in the upper wall of the stepped-up portion 30 in positions between the slit array 30A and the battery cell receiving portion 28. The slits 30A and 30B are formed in positions corresponding to positions of the battery-pack-side electrode terminals 25A and 25B and of the driver-side electrode terminals. When the battery pack 15 is inserted into the inner space of the grip portion 12B, the driver-side electrode terminals pass through the slits 30A and 30B and are brought into electrical contact with the battery-pack-side electrode terminals 25A and 25B.

The battery assembly 26 includes three battery cells 18A and 18B arranged as describe with reference to FIGS. 3A-3B and 4A-4B. Specifically, the battery cell 18A is vertically arranged and two battery cells 18B are horizontally arranged in parallel to and in alignment with each other. The battery assembly 26 further includes a circuit board 19, a battery holding member 27, and the battery-pack-side electrode terminals 25A and 25B. The battery holding member 27 holds the two horizontally arranged battery cells 18B. The circuit board 19 is disposed on and secured to the battery holding member 27 with screws. The circuit board 19 is thus disposed above the horizontally arranged battery cells 18B. The battery cells 18A and 18B are connected by electric wires (not shown) to protection circuits (not shown) mounted on the circuit board 19. The protection circuits are provided for protecting the battery cells 18A and 18B from over-current, over-discharging, and over-charging when charged with a battery charger. The battery-pack-side electrode terminals 25A and 25B are mounted on the circuit board 19 and are brought into engagement with the driver-side electrode terminals 24 when the battery pack 15 is inserted into the inner space 12C of the grip portion 12B.

Seven battery-pack-side electrode terminals are provided on the circuit board 19. Of the seven electrode terminals, five electrode terminals 5A are juxtaposed in a direction orthogonal to the longitudinal direction of the horizontally arranged battery cells 18B and two electrode terminals 5B are interposed between the array of the electrode terminals 5A and the vertically arranged battery cell 18A. The direction in which the electrode terminals 25B are oriented is orthogonal to the direction in which the electrode terminals 25A are oriented. These electrode terminals 25A and 25B are disposed in positions closer to the vertically arrange battery cell 18A than the front-side edge of the cover portion 29 and do not protrude outside a range defined by an imaginary line B connecting the top end of the battery cell receiving portion 28 and the front-side edge of the cover portion 29. With such a structure, the electrode terminals 25A and 25B are not damaged or destroyed even if the battery pack 15 is not held with its flat bottom but with two points on the imaginary line B.

The circuit board 19 is placed in a direction orthogonal to a connection direction of the battery pack-side electrode terminals 25A and 25B with the corresponding electrode terminals at the side of the driver drill 11.

Through the relevant electrode terminals 25A and 25B, the battery voltage is applied to the motor 13, and various signals including a battery temperature-indicating signal, a battery type identification signal, and an error signal are applied to the protection circuits. Two electrode terminals 50A and 50B apart furthest from one to the other are used to apply the battery voltage to the motor 13. These two electrode terminals in the battery pack side are connected to the two drill-side electrode terminals, respectively. The electrode terminals 25A and 25B are used as well when charging the battery cells 18A and 18B with a battery charger.

As shown in FIG. 8, the lower case 17B is formed with locking pawls 32 at both sidewalls thereof. The locking pawls 32 engage pawl engagement portions formed in the inner wall of the pedestal 20. The upper case 17A is formed with deformation regulating members 31 for preventing the locking pawls 32 from inwardly deforming for more than a predetermined amount. More specifically, the locking pawls 32 are inwardly deformable when the combined battery pack 15 is inserted into the battery cell receiving space. The deformation regulating members 31 limit the deformed amount of the locking pawls 32.

As shown in FIG. 9, a partition 35 is provided between two adjacent electrode terminals 25A and 25B. The partition 35 is also provided between adjacent slits 30A and 30B. The partition 35 vertically extends from the top surface of the cover portion 29 to the circuit board 19. Although not shown in the drawings, another partition is provided to separate the first set of electrode terminals 25A from the second set of electrode terminals 25B.

A sealing member 24 is interposed between the partitions 35 and the circuit board 19. The sealing member 24 is a sheet-like member having resiliency made from, for example, rubber or silicon. The sealing member 2 has a thickness greater than a gap between the partitions 35 and the circuit board 19. The sealing member 24 is formed with holes in positions corresponding to the position of the electrode terminals 25A and 25B. The sealing member 24 is sandwiched between the partitions 35 and the circuit board 19 while passing the electrode terminals 25A and 25B into the corresponding holes formed in the sealing member 24. Due to the elastic nature of the sealing member 24, spaces between adjacent partitions 35 are hermetically sealed and a space surrounded by the partitions 35 and the internal portion of the battery pack 15 are spatially partitioned. By virtue of the sealing member 24, dusts and/or water contents in the space between the partitions 35 are prevented from entering into the interior of the battery pack 15. Hence, it is capable of using the battery pack 15 in a water-proof and dust-free state.

As shown in FIG. 10, insertion regulating protrusions 28A are formed at both sides of the lower case 17B. The battery cell receiving portion 28 is formed with insertion regulating portions (not shown) mated with the insertion regulating protrusions 28A. The shape, position or horizontally protruded amount of the insertion regulating protrusion 28A is determined depending upon the type of the battery pack different in rated voltage. The insertion regulating portions formed in the inner wall of the battery cell receiving portion 28 are so shaped that only the available battery packs can be inserted into the battery cell receiving portion 28.

Although the present invention has been described with respect to specific embodiments, it will be appreciated by one skilled in the art that a variety of changes may be made without departing from the scope of the invention. For example, the embodiment describes that the battery cell receiving portion is positioned at the rear-side of the batter pack, it may be positioned at the center of the battery pack. Further, the present invention is applicable not only to a driver drill but also other types of power tools using a motor as a driving source. The embodiment described above shows the partitions provided between adjacent electrode terminals. The embodiment may be modified so that the partitions are provided only to the portions to surround each of the first and second sets of electrode terminals 25A and 25B.

The battery pack may contain more than three battery cells, in which one battery cell is arranged vertically and the remaining battery cells are arranged horizontally.

The invention claimed is:

1. A battery pack detachably mountable on a power tool having a body portion containing a battery-driven motor, the battery pack comprising:
    a case having a first portion and a second portion in which the first portion is inserted into the power tool and the second portion is projected from the power tool when the battery pack is mounted on the power tool, the first portion being provided above the second portion; and
    a plurality of battery cells including at least a first battery cell, a second battery cell, and a third battery cell, of which at least the first battery cell is disposed in the first portion and at least the second and third battery cells are disposed in the second portion, wherein each of the battery cells in the second portion is arranged in a direction in which the body portion of the power tool on which the battery pack is mounted extends,
    wherein at least a portion of the first battery cell is disposed inside the power tool when the battery pack is mounted on the power tool,
    wherein the longitudinal axis of the first battery cell extends in substantially a vertical direction, and wherein the longitudinal axes of the second and third battery cells extend in substantially a horizontal direction.

2. The battery pack according to claim 1, further comprising a circuit board disposed in the second portion and above the second and third battery cells.

3. The battery pack according to claim 1, wherein each of the plurality of battery cells is substantially cylindrically shaped having a circular cross-section, and a sum of diameters of two batteries is smaller than a diameter of the motor of the power tool.

4. The battery pack according to claim 1, wherein each of the plurality of battery cells is elongated and substantially cylindrically shaped having an outer periphery and end faces at two opposite sides, and the end faces at one side of the second and third battery cells are in contact with the outer periphery of the first battery cell.

5. The battery pack according to claim 1, wherein the first battery cell is positioned below a gravity point of the motor when the battery back is mounted on the power tool.

6. The battery pack according to claim 1, wherein each of the plurality of battery cells is a lithium-ion battery.

7. The battery pack according to claim 1, further comprising a plurality of electrode terminals connected to the plurality of battery cells, and a circuit board for mounting the plurality of electrode terminals thereon, wherein the second portion is separable from the first portion, and wherein the circuit board is interposed between the first and second portions when the first and second portions are combined.

8. The battery pack according to claim 7, wherein the second portion is a boat-like shape having a flat bottom and an upper opening, at least the second and third battery cells being accommodated in the second portion, and the first portion has a cover portion for covering the upper opening of the second portion, the cover portion having a first longitudinal end and a second longitudinal end, and a battery cell receiving portion protruding upward from the first longitudinal end of the cover portion and receiving at least the first battery cell therein, wherein the plurality of electrode terminals are disposed in positions closer to the battery cell receiving portion than the second longitudinal end of the cover portion.

9. The battery pack according to claim 7, wherein the plurality of electrode terminals is divided into a first set of electrode terminals aligned in a direction orthogonal to a longitudinal direction of the cover portion, and a second set of electrode terminals oriented in a direction orthogonal to a direction in which the first set of electrode terminals is oriented.

10. The battery pack according to claim 7, wherein the circuit board is placed in a direction orthogonal to a direction in which the plurality of electrode terminals is connected to corresponding electrode terminals at a side of the power tool.

11. The battery pack according to claim 7, further comprising a partition provided for each of the plurality of electrode terminals.

12. The battery pack according to claim 11, further comprising a seal member interposed between the partition and the circuit board for sealing a space between the partitions.

13. The battery pack according to claim 7, wherein the circuit board is supported by the second and third battery cells.

14. The battery pack according to claim 7, further comprising a damper interposed between each of the first, second and third battery cells and the case.

15. The battery pack according to claim 7, wherein the second portion is formed with a locking pawl engaged with a pawl engagement portion provided in the power tool when the second portion is fully inserted into the power tool, and the second portion is further formed with a deformation regulating member for regulating a deformed amount of the locking pawl.

16. A power tool comprising:
    a motor;
    a body portion accommodating the motor therein and extending in a direction;
    a grip portion extending from the body portion; and
    a battery pack detachably mounted on a battery pack receiving space of the grip portion, the battery pack including a case having a first portion and a second portion in which the first portion is inserted into the grip portion and the second portion is projected from the grip portion when the battery pack is mounted on the battery pack receiving space, the first portion being provided above the second portion; and a plurality of battery cells including at least a first battery cell, a second battery cell, and a third battery cell, of which at least the first battery cell is disposed in the first portion and at least the second and third battery cells are disposed in the second portion, wherein each of the battery cells in the second portion is arranged in the direction in which the body portion extends, wherein at least a portion of the first battery cell is disposed inside the grip portion when the battery pack is mounted on the battery pack receiving space, wherein the longitudinal axis of the first battery cell extends in substantially a vertical direction, and wherein the longitudinal axes of the second and third battery cells extend in substantially a horizontal direction.

17. The power tool according to claim 16, wherein the battery pack further comprises a circuit board disposed in the second portion and above the second and third battery cells.

18. The power tool according to claim 16, wherein each of the plurality of battery cells is substantially cylindrically shaped having a circular cross-section, and a sum of diameters of two batteries is smaller than a diameter of the motor.

19. The power tool according to claim 16, wherein each of the plurality of battery cells is elongated and substantially cylindrically shaped having an outer periphery and end faces at two opposite sides, and the end faces at one side of the second and third battery cells are in contact with the outer periphery of the first battery cell.

20. The power tool according to claim 16, wherein the first battery cell is positioned below a gravity point of the motor.

21. The power tool according to claim 16, wherein each of the plurality of battery cells is a lithium-ion battery.

22. The power tool according to claim 16, further comprising:

a plurality of first electrode terminals having first ends connected to the motor and second ends;

a plurality of second electrode terminals having third ends connected to the plurality of battery cells and fourth ends connected to the second ends of the plurality of first electrode terminals; and a circuit board for mounting the plurality of second electrode terminals thereon, wherein the case comprises a first case and a second case, the second case being separable from the first case and insertable into the battery pack receiving space of the grip portion, and wherein the circuit board is interposed between the first and second cases when the first and second cases are combined.

23. The power tool according to claim 22, wherein the second portion is a boat-like shape having a flat bottom and an upper opening, at least the second and third battery cells being accommodated in the second portion, and the first portion has a cover portion for covering the upper opening of the second portion, the cover portion and having a first longitudinal end and a second longitudinal end, and a battery cell receiving portion protruding upward from the first longitudinal end of the cover portion and receiving first battery cell therein, wherein the plurality of second electrode terminals are disposed in positions closer to the battery cell receiving portion than the second longitudinal end of the cover portion.

24. The power tool according to claim 22, wherein the plurality of second electrode terminals is divided into a first set of electrode terminals aligned in a direction orthogonal to a longitudinal direction of the cover portion, and a second set of electrode terminals oriented in a direction orthogonal to a direction in which the first set of electrode terminals is oriented.

25. The power tool according to claim 22, wherein the circuit board is placed in a direction orthogonal to a direction in which the plurality of first electrode terminals is connected to respective ones of the plurality of second electrode terminals individually.

26. The power tool according to claim 22, further comprising a partition provided for each of the plurality of second electrode terminals.

27. The power tool according to claim 26, further comprising a seal member interposed between the partition and the circuit board for sealing a space between the partitions.

28. The power tool according to claim 22, wherein the circuit board is supported by the second and third battery cells.

29. The power tool according to claim 22, further comprising a damper interposed between each of the first, second and third battery cells and the case.

30. The power tool according to claim 22, wherein the second case is formed with a locking pawl engaged with a pawl engagement portion provided in the grip portion when the second case is fully inserted into the battery pack receiving space of the grip portion, and the second case is further formed with a deformation regulating member for regulating a deformed amount of the locking pawl.

31. A power tool comprising:

a motor;

a body portion accommodating the motor therein and extending in a direction;

a battery pack receiving portion extending from the body portion; and a battery pack detachably mounted on a battery pack receiving space of the battery pack receiving portion, the battery pack including a case having a first portion and a second portion in which the first portion is inserted into the battery pack receiving portion and the second portion is projected from the battery pack receiving portion when the battery pack is mounted on the battery pack receiving space, the first portion being provided above the second portion; and a plurality of battery cells including at least a first battery cell, a second battery cell, and a third battery cell, of which at least the first battery cell is disposed in the first portion and at least the second and third battery cells are disposed in the second portion, wherein each of the battery cells in the second portion is arranged in the direction in which the body portion extends, wherein at least a portion of the first battery cell is disposed inside the battery pack receiving portion when the battery pack is mounted on the battery pack receiving space, wherein the longitudinal axis of the first battery cell extends in substantially a vertical direction, and wherein the longitudinal axes of the second and third battery cells extend in substantially a horizontal direction.

32. The power tool according to claim 31, wherein a longitudinal direction of the body portion and a longitudinal direction of the battery pack receiving portion are oriented in a plane, wherein longitudinal directions of the first, second and third battery cells are parallel to the plane.

33. The power tool according to claim 31, further comprising:

a plurality of first electrode terminals having first ends connected to the motor and second ends;

a plurality of second electrode terminals having third ends connected to the plurality of battery cells and fourth ends connected to the second ends of the plurality of first electrode terminals; and a circuit board for mounting the plurality of second electrode terminals thereon, wherein the case comprises a first case and a second case, the second case being separable from the first case and insertable into the battery pack receiving space of the battery pack receiving portion, and wherein the circuit board is interposed between the first and second cases when the first and second cases are combined.

34. The power tool according to claim 33, wherein the second portion is a boat-like shape having a flat bottom and an upper opening, at least the second and third battery cells being accommodated in the second portion, and the first portion has a cover portion for covering the upper opening of the second portion, the cover portion and having a first longitudinal end and a second longitudinal end, and a battery cell receiving portion protruding upward from the first longitudinal end of the cover portion and receiving first battery cell therein, wherein the plurality of second electrode terminals are disposed in positions closer to the battery cell receiving portion than the second longitudinal end of the cover portion.

35. The power tool according to claim 31, wherein the battery pack further comprises a circuit board disposed in the second portion and above the second and third battery cells.

36. The power tool according to claim 31, wherein each of the plurality of battery cells is substantially cylindrically shaped having a circular cross-section, and a sum of diameters of two batteries is smaller than a diameter of the motor.

37. The power tool according to claim 31, wherein each of the plurality of battery cells is a lithium-ion battery.

38. The power tool according to claim 33, further comprising a partition provided for each of the plurality of second electrode terminals.

39. The power tool according to claim 33, wherein the circuit board is supported by the second and third battery cells.

40. The power tool according to claim 33, wherein the second case is formed with a locking pawl engaged with a pawl engagement portion provided in the battery pack receiving portion when the second case is fully inserted into the battery pack receiving space of the battery pack receiving portion, and the second case is further formed with a deformation regulating member for regulating a deformed amount of the locking pawl.

* * * * *